(12) United States Patent
Hosoi

(10) Patent No.: US 7,417,237 B2
(45) Date of Patent: Aug. 26, 2008

(54) RADIOGRAPHIC IMAGE CONVERSION PANEL FOR MAMMOGRAPHY AND METHOD OF MANUFACTURING THE SAME

(75) Inventor: Yuichi Hosoi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 50 days.

(21) Appl. No.: 11/207,780

(22) Filed: Aug. 22, 2005

(65) Prior Publication Data

US 2006/0038135 A1 Feb. 23, 2006

(30) Foreign Application Priority Data

Aug. 20, 2004 (JP) .............................. 2004-241411

(51) Int. Cl.
*G03B 42/08* (2006.01)
*G21K 4/00* (2006.01)
*G01T 1/20* (2006.01)
*G01N 21/64* (2006.01)

(52) U.S. Cl. .................. 250/483.1; 250/367; 250/484.4

(58) Field of Classification Search .............. 250/484.4, 250/367, 483.1

See application file for complete search history.

(56) References Cited

U.S. PATENT DOCUMENTS 4,939,018 A * 7/1990 Kohda et al. ................. 428/192
6,278,118 B1 * 8/2001 Homme et al. ......... 250/370.11
2002/0050570 A1 * 5/2002 Isoda ....................... 250/484.4
2003/0038249 A1 2/2003 Hackenschmied et al.
2003/0066972 A1 4/2003 Leblans et al.
2003/0071228 A1 4/2003 Van Den Bergh et al.
2004/0169150 A1 * 9/2004 Nakajo .................... 250/484.4
2005/0008767 A1 1/2005 Van Den Bergh et al.

FOREIGN PATENT DOCUMENTS

JP 2002-071899 A 3/2002
JP 2003-149396 A 5/2003
JP 2003-248093 A 9/2003

* cited by examiner

*Primary Examiner*—David P. Porta
*Assistant Examiner*—Mindy Vu
(74) *Attorney, Agent, or Firm*—Sughrue Mion, PLLC

(57) ABSTRACT

The radiographic image conversion panel for mammography includes a phosphor layer formed on a rectangular substrate having first and second pairs of two parallel sides, and sealed with a moisture-proof protective film. The phosphor layer is positioned on the substrate such that a distance from at least one side of the first pair to an adjacent end of the phosphor layer is shorter than a critical bonding length being a shortest bonding length long enough to provide a predetermined level of moisture-proof effect and distances from two sides of the second pair to adjacent ends of the phosphor layer are not shorter than the critical length. A seal bonding layer is formed in areas of the second distance, and on a side surface having the at least one side or on the side surface and a rear surface of the substrate. The phosphor layer may be formed in a recess formed in the substrate.

17 Claims, 6 Drawing Sheets

RADIOGRAPHIC IMAGE CONVERSION PANEL FOR MAMMOGRAPHY AND METHOD OF MANUFACTURING THE SAME

The entire contents of literatures cited in this specification are incorporated herein by reference.

BACKGROUND OF THE INVENTION

The present invention relates to a highly productive radiographic image conversion panel for mammography that can secure a large enough image-forming area to photograph the chest wall and that avoids degradation of characteristics due to moisture absorption, and a method of manufacturing the panel.

There are known a class of phosphors which accumulate a portion of applied radiations (e.g. x-rays, $\alpha$-rays, $\beta$-rays, $\gamma$-rays, electron beams, and uv (ultraviolet) radiation) and which, upon stimulation by exciting light such as visible light, give off a burst of light emission in proportion to the accumulated energy. Such phosphors called stimulable phosphors are employed in medical and various other applications.

An exemplary application is a radiographic image information recording and reproducing system which employs a radiographic image conversion panel having a film formed of the stimulable phosphor (stimulable phosphor layer). This radiographic image information recording and reproducing system has already been commercialized as FCR (Fuji Computed Radiography) from Fuji Photo Film Co., Ltd.

In that system, a subject such as a human body is irradiated with x-rays or the like to record radiographic image information about the subject on the radiographic image conversion panel (more specifically, the stimulable phosphor layer). After the radiographic image information is thus recorded, the radiographic image conversion panel is scanned two-dimensionally with exciting light such as laser light to produce stimulated emission which, in turn, is read photoelectrically to yield an image signal. Then, an image reproduced on the basis of the read image signal is output as the radiographic image of the subject, typically to a display device such as CRT or on a recording material such as a photographic material.

The radiographic image conversion panel is typically produced by the steps of first preparing a coating solution having particles of a stimulable phosphor dispersed in a solvent containing a binder, etc., applying the coating solution to a support in panel form that is made of glass or resin, and drying the applied coating.

Phosphor panels are also known that are made by forming a stimulable phosphor layer (hereinafter also referred to as a phosphor layer) on a support through methods of vacuum film deposition (vapor-phase film formation) such as vacuum evaporation or sputtering. The phosphor layer prepared by the vacuum film deposition has excellent characteristics. First, it contains less impurities since it is formed under vacuum; further, it is substantially free of any substances other than the stimulable phosphor, as exemplified by the binder, so it has high uniformity in performance and still assures very high luminous efficiency.

One factor for deterioration of characteristics of the radiographic image conversion panel is moisture absorption by the stimulable phosphor layer.

The stimulable phosphor layer, in particular, the alkali halide-based stimulable phosphor layer having favorable characteristics, has high moisture absorption and easily absorbs moisture even in a normal environment (normal temperature/normal humidity). As a result, deterioration of sharpness of a reproduced image or the like occurs due to deterioration of photostimulated luminescence characteristics, that is, sensitivity, or deterioration of crystallinity of the stimulable phosphor (destruction of columnar crystals in the case of the alkali halide-based stimulable phosphor having a columnar structure, for example).

In order to solve such problems, the phosphor layer of the radiographic image conversion panel is sealed with a moisture-proof member (see JP 2003-248093 A, JP 2003-149396 A and JP 2002-71899 A).

JP 2003-248093 A discloses a radiographic image conversion panel including a support, a stimulable phosphor layer formed on the support, and a protective layer. In this radiographic image conversion panel, when the distance between an end face of the radiographic image conversion panel and an end face of the stimulable phosphor layer formed on the support is represented by t, t is 4 mm or less on each of the four sides of the radiographic image conversion panel.

Also disclosed in JP 2003-248093 A is a radiographic image conversion panel 100 in which, as shown in FIGS. 9A and 9B, a polyethylene terephthalate sheet or other plastic sheet used for a protective film 106 is adhered to a rear face 102a of a glass support 102 on which a phosphor layer 104 is formed, thereby sealing the phosphor layer 104 therein. In the radiographic image conversion panel 100, a polyethylene terephthalate sheet slightly larger than the support 102 is superposed on the support 102 and the polyethylene terephthalate sheet and the support 102 are fully bonded together. Then, three of the four sides of the polyethylene terephthalate sheet are firmly bonded to the rear face 102a of the support 102 using a sealant or by heat bonding. Thereafter, the pressure is reduced through the remaining side to bring the protective film 106 into intimate contact with the phosphor layer 104 and the phosphor layer 104 is completely sealed therein using a sealant or by heat bonding.

JP 2003-248093 A also discloses a radiographic image conversion panel 110 which has, as shown in FIGS. 10A and 10B, a spacer 116 made of glass on each of the four sides of the panel. On one of the four sides, the spacer 116 is bonded to a support 112 and to a protective layer 118 made of glass to seal a phosphor layer 114 at a position at which the distance from an end face of the phosphor layer 114 to an end face of the panel is equal to the width of the spacer 116.

In the radiographic image conversion panel 110, on one of the four sides, the distance S between an end face of the phosphor layer 114 and an end face of the radiographic image conversion panel 110 is no larger than the width of the spacer 116. If, for example, the width S of the spacer 116 is 1 mm, the photograph area starts immediately from the edge of the radiographic image conversion panel 110 on this side.

JP 2003-149396 A discloses a phosphor screen and a phosphor panel which have a support, a phosphor layer formed on the support, and a moisture-proof protective over-coating layer. The phosphor layer is smaller in surface area than the support, so that the edges of the phosphor layer do not reach the edges of the support. The over-coating layer is formed on the support to cover the phosphor layer.

JP 2002-71899 A discloses a radiographic image conversion panel in which moisture-proof protective films are used to cover the top face and bottom face of a phosphor sheet having a stimulable phosphor layer formed on a support, and which uses an impulse roller to heat seal the perimeter of the phosphor sheet.

The radiographic image conversion panels 100 and 110 disclosed in JP 2003-248093 A and shown in FIGS. 9A and 9B, and FIGS. 10A and 10B both have a problem in that their manufacture processes are complicated, which leads to low productivity and high manufacture cost.

The manufacture process of the radiographic image conversion panel 100 shown in FIGS. 9A and 9B is particularly complicated, because a polyethylene terephthalate sheet has to be bonded to the rear face 102a on three sides with a sealant, by heat bonding, or the like.

In addition, the radiographic image conversion panel 110 shown in FIGS. 10A and 10B cannot obtain enough sealing effect when the width S of the spacer 116 is small, because the sealing portion is narrowed and the joining area between the spacer 116 and the protective layer 118 becomes small.

The phosphor screen and phosphor panel of JP 2003-149396 A have a problem in that no image can be formed on the perimeter of the phosphor screen or the phosphor panel, because the phosphor layer is smaller in surface area than the support. The screen or panel thus fails to secure a large enough image-forming area to photograph the chest wall required for mammography.

Further, an image cannot be formed on the perimeter of the radiographic image conversion panel of JP 2002-71899 A, in which the perimeter is heat sealed and therefore a margin for heat seal is needed. The screen or panel thus fails to secure a large enough image-forming area to photograph the chest wall required for mammography.

SUMMARY OF THE INVENTION

The present invention has been made to solve the above-described problems of prior art, and an object of the present invention is therefore to provide a highly productive radiographic image conversion panel for mammography that secures a large enough image-forming area to photograph the chest wall and that can avoid degradation of characteristics of a stimulable phosphor layer caused by moisture absorption.

Another object of the present invention is to provide a method of manufacturing the radiographic image conversion panel.

In order to achieve the above-mentioned object, according to a first aspect of the present invention, a radiographic image conversion panel for mammography comprising: a substrate having a rectangular shape, and first and second pairs of two parallel sides being orthogonal to each other; a stimulable phosphor layer having a rectangular shape, and being formed on the substrate; a moisture-proof protective film for sealing the stimulable phosphor layer; and a seal bonding layer for bonding the perimeter of the moisture-proof protective film to the substrate, wherein the stimulable phosphor layer is positioned on the substrate such that a distance from at least one side of the first pair of two parallel sides of the substrate to an adjacent end of the stimulable phosphor layer is a first distance which is not long enough to provide a predetermined level of moisture-proof effect when the moisture-proof protective film is bonded to the substrate through the seal bonding layer, and such that distances from two sides of the second pair of two parallel sides of the substrate to adjacent ends of the stimulable phosphor layer are a second distance which is longer than the first distance, and is long enough to provide the predetermined level of the moisture-proof effect when the moisture-proof protective film is bonded to the substrate through the seal bonding layer, and wherein the seal bonding layer is formed in areas of the second distance on the second pair of two parallel sides of the substrate along the perimeter of the stimulable phosphor layer, and is formed on a side surface having the at least one side of the first pair of two parallel sides of the substrate, or on the side surface and a rear surface of the substrate.

Preferably, the radiographic image conversion panel for mammography of the first aspect of the present invention further comprises a sealing portion which is formed on the substrate such that the stimulable phosphor layer is surrounded in a direction of a surface of the substrate and to which the moisture-proof protective film is bonded with the seal bonding layer, and a level difference between the stimulable phosphor layer and the sealing portion in an area that at least corresponds to the second distance is within ±0.3 mm.

According to a second aspect of the present invention, a radiographic image conversion panel for mammography comprising: a substrate having a rectangular shape, and first and second pairs of two parallel sides being orthogonal to each other; a recess formed in the substrate and having a rectangular shape in plan view; a stimulable phosphor layer being formed in the recess; a moisture-proof protective film for sealing the stimulable phosphor layer; and a seal bonding layer for bonding the perimeter of the moisture-proof protective film to the substrate, wherein the recess is positioned on the substrate such that a distance from at least one side of the first pair of two parallel sides of the substrate to an adjacent inner wall of the recess is a first distance which is not long enough to provide a predetermined level of moisture-proof effect when the moisture-proof protective film is bonded to the substrate through the seal bonding layer, and such that distances from two sides of the second pair of two parallel sides of the substrate to adjacent inner walls of the recess are a second distance which is longer than the first distance, and is long enough to provide the predetermined level of the moisture-proof effect when the moisture-proof protective film is bonded to the substrate through the seal bonding layer, and wherein the seal bonding layer is formed in areas of the second distance on the second pair of two parallel sides of the substrate along the perimeter of the stimulable phosphor layer, and is formed on a side surface having the at least one side of the first pair of two parallel sides of the substrate, or on the side surface and a rear surface of the substrate.

In the second aspect of the present invention, a level difference between a front surface of the stimulable phosphor layer and a front surface of the substrate in an area that at least corresponds to the second distance is preferably within ±3 mm.

In the first and second aspect of the present invention, it is preferable that the first distance is shorter than a critical bonding length being a shortest bonding length which is long enough to provide the predetermined level of the moisture-proof effect when the moisture-proof protective film is bonded to the substrate through the seal bonding layer, and the second distance is equal to or longer than the critical bonding length.

In the first and second aspect of the present invention, it is further preferable that the critical bonding length is 2 mm, the first distance is less than 2 mm and the second distance is 2 mm or more.

In the first and second aspect of the present invention, it is further preferable that the seal bonding layer has a moisture vapor transmission rate of 1000 g/m$^2$·day or less, a width of from 2 mm to 10 mm, and a thickness of from 0.5 μm to 20 μm.

Provided according to a third aspect of the present invention is a method of manufacturing a radiographic image conversion panel for mammography in which a stimulable phosphor layer is formed on a rectangular substrate having a rectangular shape, and first and second pairs of two parallel sides being orthogonal to each other, and sealed with a moisture-proof protective film, comprising: a step of forming the stimulable phosphor layer on the substrate such that a distance from at least one side of the first pair of two parallel sides of the substrate to an adjacent end of the stimulable phosphor layer is a first distance which is not long enough to provide a predetermined level of moisture-proof effect when the moisture-proof protective film is bonded to the substrate through the seal bonding layer, and such that distances from two sides of the second pair of two parallel sides of the substrate to adjacent ends of the stimulable phosphor layer are a second distance which is longer than the first distance, and is long enough to provide the predetermined level of the moisture-proof effect when the moisture-proof protective film is bonded to the substrate through the seal bonding layer; a step of applying an adhesive to areas of the second distance on the second pair of two parallel sides of the substrate along the perimeter of the stimulable phosphor layer and to a side surface having the at least one side of the first pair of two parallel sides of the substrate, or the side surface and a rear surface of the substrate; and a step of bonding the perimeter of the moisture-proof protective film to the areas and the side surface, or the side surface and the rear surface where the adhesive have been applied.

Provided according to a fourth aspect of the present invention is a method of manufacturing a radiographic image conversion panel for mammography in which a stimulable phosphor layer is formed on a rectangular substrate having a rectangular shape, and first and second pairs of two parallel sides being orthogonal to each other, and sealed with a moisture-proof film, comprising: a step of forming a recess in the substrate such that a distance from at least one side of the first pair of two parallel sides of the substrate to an adjacent inner wall of the recess is a first distance which is not long enough to provide a predetermined level of moisture-proof effect when the moisture-proof protective film is bonded to the substrate through the seal bonding layer, and such that distances from two sides of the second pair of two parallel sides of the substrate to adjacent inner walls of the recess are a second distance which is longer than the first distance, and is long enough to provide the predetermined level of the moisture-proof effect when the moisture-proof protective film is bonded to the substrate through the seal bonding layer; a step of forming the stimulable phosphor layer in the recess; a step of applying an adhesive to areas of the second distance on the second pair of two parallel sides of the substrate along the perimeter of the stimulable phosphor layer and to a side surface having the at least one side of the first pair of two parallel sides of the substrate, or the side surface and a rear surface of the substrate; and a step of bonding the perimeter of the moisture-proof protective film to the areas and the side surface, or the side surface and the rear surface where the adhesive have been applied.

In a radiographic image conversion panel for mammography according to the first and second aspects of the present invention, a stimulable phosphor layer is positioned on a substrate, which has two pairs of two parallel sides, the pair of the first (e.g. longer) sides being referred to as first pair whereas the pair of the second (e.g. shorter) sides being referred to as second pair, such that the distance from a first (e.g. longer) end of the stimulable phosphor layer to at least one of the first sides of the first pair of parallel sides is not long enough to provide a predetermined level of moisture-proof effect when a moisture-proof protective film is bonded to the substrate through a seal bonding layer, the distance being referred to as a first distance, and such that the distance from the second (e.g. shorter) ends of the stimulable phosphor layer to the two sides of the second pair of parallel sides is long enough to provide a predetermined level of moisture-proof effect when the moisture-proof protective film is bonded through the seal bonding layer, the distance being referred to as a second distance, the second distance being larger than the first distance, and the seal bonding layer is formed in areas of the second distance along the perimeter of the stimulable phosphor layer, and is formed on side faces having the first sides of the substrate or on a rear face of the substrate. This makes it possible to reduce the distance from the stimulable phosphor layer to the longer side faces of the substrate. Accordingly, a large enough image-forming area necessary to photograph the chest wall is secured. Furthermore, since an area where a predetermined level of moisture-proof effect is obtained is provided on each side of the stimulable phosphor layer, degradation of image recording characteristics due to moisture absorption can be avoided for a long period of time even under severe conditions created by high temperature and high humidity.

Moreover, a satisfactory moisture-proof property is obtained by merely bonding the perimeter of the moisture-proof protective film to side faces or bottom face of the substrate through the seal bonding layer, without needing any special member, even in the case where the distance from the stimulable phosphor layer to a longer side face of the substrate is too short for the moisture-proof protective film to provide a predetermined level of moisture-proof effect when bonded to the substrate. A radiographic image conversion panel of the present invention can therefore be manufactured easily at high productivity. The productivity can be further raised if a roll-like moisture-proof protective film is employed.

Further, in a method of manufacturing a radiographic image conversion panel for mammography according to the third and fourth aspects of the present invention, a stimulable phosphor layer is positioned on a substrate, which has two pairs of two parallel sides, the pair of the first (e.g. longer) sides being referred to as first pair whereas the pair of the second (e.g. shorter) sides being referred to as second pair, such that the distance from a first (e.g. longer) end of the stimulable phosphor layer to at least one of the first sides of the first pair of parallel sides is not long enough to provide a predetermined level of moisture-proof effect when a moisture-proof protective film is bonded to the substrate through a seal bonding layer, the distance being referred to as a first distance, and such that the distance from the second (e.g. shorter) ends of the stimulable phosphor layer to the two sides of the second pair of parallel sides is long enough to provide a predetermined level of moisture-proof effect when the moisture-proof protective film is bonded through the seal bonding layer, the distance being referred to as a second distance, the second distance being larger than the first distance, and the seal bonding layer is formed in areas of the second distance along the perimeter of the stimulable phosphor layer, and is formed on side faces having the first sides of the substrate or on a rear face of the substrate. This makes it possible to reduce the distance from the stimulable phosphor layer to the longer side faces of the substrate. Accordingly, a large enough image-forming area necessary to photograph the chest wall is secured. Furthermore, since an area where a predetermined level of moisture-proof effect is obtained is provided on each side of the stimulable phosphor layer, degradation of image recording characteristics due to moisture absorption can be avoided for a long period of time even under severe conditions created by high temperature and high humidity.

Moreover, a satisfactory moisture-proof property is obtained by merely bonding the perimeter of the moisture-proof protective film to side faces or bottom face of the substrate with an adhesive, without needing any special member, even in the case where the distance from the stimulable phosphor layer to a longer side face of the substrate is too short for the moisture-proof protective film to provide a predetermined level of moisture-proof effect when bonded to the substrate. A radiographic image conversion panel of the present invention can therefore be manufactured easily at high productivity. The productivity can be further raised if a roll-like moisture-proof protective film is employed.

DETAILED DESCRIPTION OF THE PREFERRED EMBODIMENTS

A detailed description will be given below on a radiographic image conversion panel for mammography and its manufacturing method according to the present invention based on preferred embodiments illustrated in the accompanying drawings.

Figure 1A:
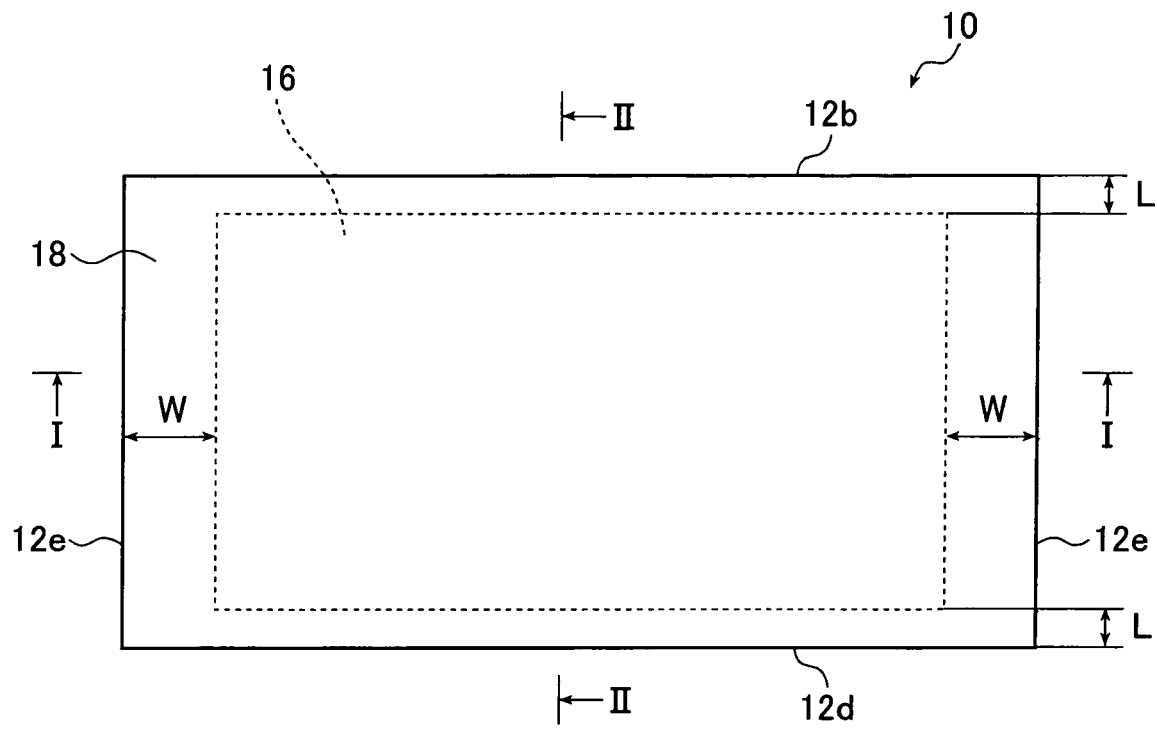
FIG. 1A is a schematic plan view showing a radiographic image conversion panel for mammography according to a first embodiment of the present invention.
Figure 1B:
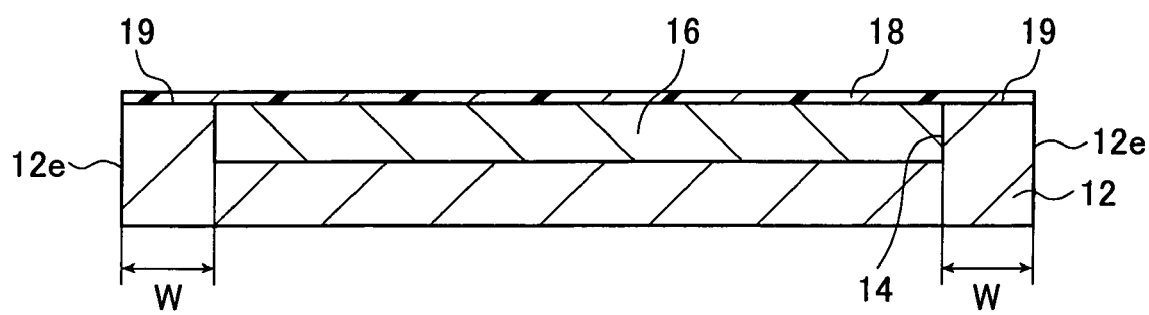
FIG. 1B is a sectional view taken along the line I-I of FIG. 1A.
Figure 1C:
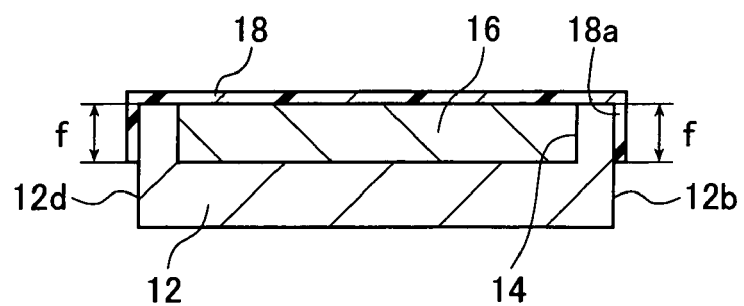
FIG. 1C is a sectional view taken along the line II-II of FIG. 1A.
Figure 2:
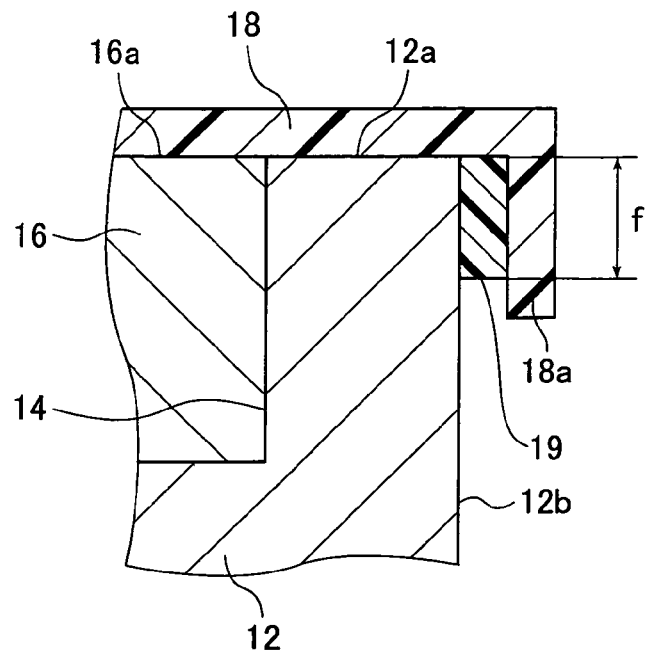
FIG. 2 is an enlarged view of an essential part of FIG. 1C.

FIG. 1A is a schematic plan view showing a radiographic image conversion panel for mammography according to a first embodiment of the present invention. FIG. 1B is a sectional view taken along the line I-I of FIG. 1A. FIG. 1C is a sectional view taken along the line II-II of FIG. 1A. FIG. 2 is an enlarged view of an essential part of FIG. 1C.

A radiographic image conversion panel (hereinafter referred to as phosphor panel) 10 for mammography shown in FIG. 1A is used in mammography with a side face 12b which includes one of two longer sides of a substrate 12, or a side face 12d which includes the other of the two longer sides of the substrate 12, facing toward the human body.

As shown in FIGS. 1A to 1C and FIG. 2, the phosphor panel 10 has the substrate 12, a stimulable phosphor layer (hereinafter referred to as phosphor layer) 16, a moisture-proof protective film 18, and a seal bonding layer 19 which bonds the perimeter of the moisture-proof protective film 18 to the substrate 12. A recess 14 is formed in the substrate 12 of the phosphor panel 10, and the phosphor layer 16 is formed in the recess 14. The moisture-proof protective film 18 is placed to cover a front face 12a of the substrate 12.

The substrate 12 is a plate-like member and has an approximately rectangular shape with two pairs of two parallel sides, the sides of one pair being orthogonal to the sides of the other pair. The side faces of the substrate 12 that include the parallel longer sides are referred to as the side face 12b having one longer side of the substrate 12 and the side face 12d having the other longer side of the substrate 12. The recess 14, which has an approximately rectangular shape in plan view, is placed substantially at the center of the front face 12a of the substrate 12 such that the longer sides of the recess 14 are parallel to the longer sides of the substrate 12.

The distance from the side face 12b having one longer side of the substrate 12 to an inner wall of the recess 14 that is parallel to the side face 12b is L, as is the distance from the side face 12d having the other longer side of the substrate 12 to an inner wall of the recess 14 that is parallel to the side face 12d. The distance from each side face 12e that includes a shorter side of the substrate 12 to an inner wall of the recess 14 that is parallel to the side face 12e is W.

The distance L (a first distance) is a length that is not long enough to provide satisfactory adhesion and accordingly a satisfactory moisture-proof property (a predetermined moisture-proof level) when the moisture-proof protective film 18 is bonded by an adhesive.

The distance W (a second distance) is a length that is long enough to provide satisfactory adhesion and accordingly a satisfactory moisture-proof property (a predetermined moisture-proof level) when the moisture-proof protective film 18 is bonded by an adhesive. The distance W is longer than the distance L. For instance, when the distance W is 2 mm or more, the distance L is less than 2 mm.

The recess 14 is provided to form the phosphor layer 16 therein. Accordingly, the distance L corresponds to the distance from a longer end of the phosphor layer 16 to the side face 12b having one longer side of the substrate 12 or to the side face 12d having the other longer side of the substrate 12. The distance W corresponds to the distance from a shorter end of the phosphor layer 16 to the side face 12e.

In this embodiment, areas where the moisture-proof protective film 18 is bonded to the substrate 12 with the phosphor layer 16 sandwiched therebetween are provided on the front face 12a of the substrate 12 along the shorter sides of the phosphor layer 16, thereby providing a satisfactory moisture-proof effect.

The phosphor layer 16 is formed in the recess 14 of the substrate 12 by, for example, vacuum film deposition. A front face 16a of the phosphor layer 16 is substantially flush with the front face 12a of the substrate 12. The level difference between the front face 16a of the phosphor layer 16 and the front face 12a of the substrate 12 is within ±0.3 mm. In the present invention, a satisfactory moisture-proof effect is obtained if, at least in the areas provided to bond the moisture-proof protective film 18 (the areas of the distance W), the front face 12a of the substrate 12 is substantially flush with the phosphor layer 16 (i.e., if the level difference between the phosphor layer 16 and the bonding areas is within ±0.3 mm).

In the present invention, various treatments may be performed before the phosphor layer 16 is formed. Examples of treatments that can precede the formation of the phosphor layer 16 include forming a reflective film in the recess 14 of the substrate 12 in order to reflect light emitted upon stimulation. On the reflective film, a barrier film or the like may be formed to protect the reflective film. The phosphor layer 16 may be formed in the recess 14 of the substrate 12 where these films have been formed.

The moisture-proof protective film 18 covers and seals the phosphor layer 16 formed by, for example, vacuum evaporation, in order to prevent the phosphor layer 16 from absorbing moisture. While the moisture-proof protective film 18 covers the front face 12a of the substrate 12, the perimeter of the moisture-proof protective film 18 is bonded to the front face, side faces, or the rear face of the substrate 12 by the seal bonding layer 19 having a bonding length f, which is long enough to give the panel a moisture-proof property. There is no particular limitation on the bonding length f of the seal bonding layer 19 if a predetermined moisture-proof level is achieved. However, as will be described later, the bonding length f is preferably equal to or longer than 2 mm. The bonding length f may be equal to the distance W.

As shown in FIG. 1C and FIG. 2, the moisture-proof protective film 18 is bent at an end where the side face 12b having one longer side of the substrate 12 is located, and the bent portion 18a is bonded to the side face 12b of the substrate 12 by the seal bonding layer 19. Similarly, the moisture-proof protective film 18 is bent at the other end where the side face 12d having the other longer side of the substrate 12 is located, and the bent portion 18a is bonded to the side face 12d of the substrate 12 by the seal bonding layer 19. The moisture-proof protective film 18 is also bonded by the seal bonding layer 19 to the front face 12a of the substrate 12 in the areas of the distance W which extend along the shorter sides of the phosphor layer 16. Thermal lamination, for example, is used to bond the moisture-proof protective film 18 to the front face, side faces, or rear face of the substrate 12 via the seal bonding layer 19.

The present invention puts no particular limitation on the substrate 12 as long as the recess 14 can be formed in the substrate 12.

Various materials used in general phosphor panels can be employed for the substrate 12. For instance, the substrate 12 can be a glass plate made from quartz glass, non-alkali glass, soda glass or heat-resistant glass (e.g., Pyrex™), or a metal sheet such as an aluminum sheet, an iron sheet, a copper sheet or a chromium sheet, or a metal sheet having a metal oxide coat layer.

Any method can be employed to form the recess 14 in the substrate 12. The recess 14 may be formed by dry etching or wet etching, for example.

Various materials can be used for the stimulable phosphor constituting the phosphor layer 16. Preferred examples of the stimulable phosphor are given below.

Stimulable phosphors disclosed in U.S. Pat. No. 3,859,527 are "SrS:Ce, Sm", "SrS:Eu, Sm", "ThO$_2$:Er", and "La$_2$O$_2$S: Eu, Sm".

JP 55-12142 A discloses "ZnS:Cu, Pb", "BaO.xAl$_2$O$_3$:Eu $(0.8 \leq x \leq 10)$", and stimulable phosphors represented by the general formula "M$^{II}$O.xSiO$_2$:A". In this formula, M$^{II}$ is at least one element selected from the group consisting of Mg, Ca, Sr, Zn, Cd, and Ba, A is at least one element selected from the group consisting of Ce, Tb, Eu, Tm, Pb, Tl, Bi, and Mn, and $0.5 \leq x \leq 2.5$.

Stimulable phosphors represented by the general formula "LnOX:xA" are disclosed by JP 55-12144 A. In this formula, Ln is at least one element selected from the group consisting of La, Y, Gd, and Lu, X is at least one element selected from Cl and Br, A is at least one element selected from Ce and Tb, and $0 \leq x \leq 0.1$.

Stimulable phosphors represented by the general formula "(Ba$_{1-x}$, M$^{2+}_x$)FX:yA" are disclosed by JP 55-12145 A. In this formula, M$^{2+}$ is at least one element selected from the group consisting of Mg, Ca, Sr, Zn, and Cd, X is at least one element selected from Cl, Br, and I, A is at least one element selected from Eu, Tb, Ce, Tm, Dy, Pr, Ho, Nd, Yb, and Er, $0 \leq x \leq 0.6$, and $0 \leq y \leq 0.2$.

JP 57-148285 A discloses the following stimulable phosphors. That is, the stimulable phosphors are represented by the general formula "xM$_3$(PO$_4$)$_2$.NX$_2$:yA" or "M$_3$ (PO$_4$)$_2$.yA". In this formula, M and N are each at least one element selected from the group consisting of Mg, Ca, Sr, Ba, Zn, and Cd, X is at least one element selected from F, Cl, Br, and I, A is at least one element selected from Eu, Tb, Ce, Tm, Dy, Pr, Ho, Nd, Yb, Er, Sb, Tl, Mn, and Sn, $0 \leq x \leq 6$, and $0 \leq y \leq 1$.

Stimulable phosphors are represented by the general formula "nReX$_3$.mAX'$_2$:xEu" or "nReX$_3$.mAX'$_2$:xEu, ySm". In this formula, Re is at least one element selected from the group consisting of La, Gd, Y, and Lu, A is at least one element selected from Ba, Sr, and Ca, X and X' are each at least one element selected from F, Cl, and Br, $1 \times 10^{-4} < x < 3 \times 10^{-1}$, $1 \times 10^{-4} < y < 1 \times 10^{-1}$, and $1 \times 10^{-3} < n/m < 7 \times 10^{-1}$.

Alkali halide-based stimulable phosphors are represented by the general formula "M$^I$X.aM$^{II}$X'$_2$.bM$^{III}$X"$_3$:cA". In this formula, M$^I$ represents at least one element selected from the group consisting of Li, Na, K, Rb, and Cs. M$^{II}$ represents at least one divalent metal selected from the group consisting of Be, Mg, Ca, Sr, Ba, Zn, Cd, Cu, and Ni. M$^{III}$ represents at least one trivalent metal selected from the group consisting of Sc, Y, La, Ce, Pr, Nd, Pm, Sm, Eu, Gd, Tb, Dy, Ho, Er, Tm, Yb, Lu, Al, Ga, and In. X, X', and X" each represent at least one element selected from the group consisting of F, Cl, Br, and I. A represents at least one element selected from the group consisting of Eu, Tb, Ce, Tm, Dy, Pr, Ho, Nd, Yb, Er, Gd, Lu, Sm, Y, Tl, Na, Ag, Cu, Bi, and Mg, $0 \leq a < 0.5$, $0 \leq b < 0.5$, and $0 \leq c < 0.2$.

Stimulable phosphors represented by the general formula "(Ba$_{1-x}$, M$^{II}_x$)F$_2$.aBaX$_2$:yEu, zA" are disclosed by JP 56-116777 A. In this formula, M$^{II}$ is at least one element selected from the group consisting of Be, Mg, Ca, Sr, Zn, and Cd, X is at least one element selected from Ci, Br, and I, A is at least one element selected from Zr and Sc, $0.5 \leq a \leq 1.25$, $0 \leq x \leq 1$, $1 \times 10^{-6} \leq y \leq 2 \times 10^{-1}$ and $0 < z \leq 1 \times 10^{-2}$.

Stimulable phosphors represented by the general formula "M$^{III}$OX:xCe" are disclosed by JP 58-69281 A. In this formula, M$^{III}$ is at least one trivalent metal selected from the group consisting of Pr, Nd, Pm, Sm, Eu, Tb, Dy, Ho, Er, Tm, Yb, and Bi, X is at least one element selected from Cl and Br, and $0 \leq x \leq 0.1$.

Stimulable phosphors represented by the general formula "Ba$_{1-x}$M$_a$L$_a$FX:yEu$^{2+}$" are disclosed by JP 58-206678 A. In this formula, M is at least one element selected from the group consisting of Li, Na, K, Rb, and Cs, L is at least one trivalent metal selected from the group consisting of Sc, Y, La, Ce, Pr, Nd, Pm, Sm, Gd, Tb, Dy, Ho, Er, Tm, Yb, Lu, Al, Ga, In, and Tl, X is at least one element selected from Cl, Br, and I, $1 \times 10^{-2} \leq x \leq 0.5$, $0 \leq y \leq 0.1$, and a is x/2.

Stimulable phosphors represented by the general formula "M$^{II}$FX.aM$^I$X'.bM$^{II}$X"$_2$.cM$^{III}$X$_3$.xA:yEu$^{2+}$" are disclosed by JP 59-75200 A. In this formula, M$^{II}$ is at least one element selected from the group consisting of Ba, Sr, and Ca, M$^I$ is at least one element selected from Li, Na, K, Rb, and Cs, M$^{III}$ is at least one divalent metal selected from Be and Mg, $M^{III}$ is at least one trivalent metal selected from the group consisting of Al, Ga, In, and Tl, A is a metal oxide, X, X', and X" are each at least one element selected from the group consisting of F, Cl, Br, and I, $0 \leq a \leq 2$, $0 \leq b \leq 1 \times 10^{-2}$, $0 \leq c \leq 1 \times 10^{-2}$, and a+b+c$\geq 10^{-6}$, $0 < x \leq 0.5$, and $0 < y \leq 0.2$.

Alkali halide-based stimulable phosphors disclosed by JP 57-148285 A are preferred because they have excellent photostimulated luminescence characteristics and the effect of the present invention is advantageously obtained. Alkali halide-based stimulable phosphors in which $M^I$ contains at least Cs, X contains at least Br, and A is Eu or Bi are more preferred, and stimulable phosphors represented by the general formula "CsBr:Eu" are particularly preferred.

The phosphor layer 16 is formed of a stimulable phosphor as described above by means of various vacuum film deposition techniques such as vacuum evaporation, sputtering and CVD (chemical vapor deposition). A coating method may be used to form the phosphor layer 16.

Of those, vacuum evaporation is preferably employed to form the phosphor layer 16 from the viewpoint of productivity or the like. In particular, multi-source vacuum evaporation is further preferably employed to form the phosphor layer 16, in which a material for a phosphor component and a material for an activator component are evaporated separately under heating. For example, the phosphor layer 16 of "CsBr:Eu" is preferably formed through multi-source vacuum evaporation in which cesium bromide (CsBr) as a material for the phosphor component and europium bromide (EuBr$_x$ (x is generally 2 to 3)) as a material for the activator component are evaporated separately under heating.

A heating method in vacuum evaporation is not particularly limited. The phosphor layer 16 may be formed through electron beam heating employing an electron gun or the like or through resistance heating. When the phosphor layer 16 is formed through multi-source vacuum evaporation, all materials may be evaporated under heating by the same heating means (such as electron beam heating). Alternatively, the material for the phosphor component may be evaporated under heating through electron beam heating, and the material for the activator component, which is in a trace amount, may be evaporated under heating through resistance heating.

There are no particularly limited conditions for film deposition under which the phosphor layer 16 must be formed, and the phosphor layer 16 may be formed under conditions for film deposition arbitrarily determined in accordance with a film deposition method, a composition of the phosphor layer 16 to be formed or the like. For example, the phosphor layer 16 is preferably formed through vacuum evaporation at a degree of vacuum of $1 \times 10^{-5}$ Pa to $1 \times 10^{-2}$ Pa and a film deposition rate of 0.05 μm/min to 300 μm/min. Note that in forming the phosphor layer 16 through multi-source vacuum evaporation, evaporation rates of the materials for the phosphor component and the activator component are controlled such that an amount ratio of the phosphor component to the activator component falls within a target range.

According to the studies conducted by the inventor of the present invention, when various stimulable phosphors as described above, in particular, an alkali halide-based stimulable phosphor such as CsBr:Eu is subjected to film deposition through vacuum evaporation, the phosphor layer 16 is preferably formed by: evacuating a system to a high degree of vacuum once; introducing an argon gas, a nitrogen gas, or the like into the system to adjust to a medium degree of vacuum of about 0.01 Pa to 3 Pa (this degree of vacuum is hereinafter referred to as medium vacuum); and carrying out vacuum evaporation through resistance heating under medium vacuum. The phosphor layer formed of the alkali halide-based phosphor such as CsBr:Eu has a columnar crystal structure, and the phosphor layer 16 obtained through film deposition under medium vacuum has a particularly favorable columnar crystal structure, and thus is preferable from the viewpoint of sharpness of an image with photostimulated luminescence characteristics.

The phosphor layer 16 formed may be heated at 300° C. or lower during film deposition through heating of the substrate 12 or the like. The heating of the phosphor layer 16 is preferably carried out at 200° C. or lower.

The thickness of the phosphor layer 16 is also not particularly limited, but the phosphor layer 16 preferably has a thickness of 50 μm or more. The phosphor layer 16 particularly preferably has a thickness of 200 μm or more. Therefore, the recess 14 has a depth of 50 μm or more and preferably 200 μm or more.

The thus-formed phosphor layer 16 is subjected to heat treatment (annealing) to impart favorable photostimulated luminescence characteristics to the phosphor layer 16 and to improve the photostimulated luminescence characteristics thereof.

The conditions for annealing the phosphor layer 16 are not particularly limited. For example, the phosphor layer 16 is preferably annealed in an inert atmosphere such as a nitrogen atmosphere at 50° C. to 600° C. (particularly 100° C. to 300° C.) for 10 minutes to 10 hours (particularly 30 minutes to 3 hours).

The heat treatment for the phosphor layer 16 may be carried out through a known method such as a method employing a firing furnace. Further, if a vacuum evaporation apparatus includes a heating means for the substrate 12, the heat treatment can be carried out using the heating means.

In the present invention, the moisture-proof protective film 18 is not particularly limited as long as it has sufficient moisture-proof property, and various types thereof can be used.

For example, the moisture-proof protective film 18 is formed of 3 layers on a polyethylene terephthalate (PET) film: an $SiO_2$ film; a hybrid layer of $SiO_2$ and polyvinyl alcohol (PVA); and an $SiO_2$ film. Other preferable examples of the moisture-proof protective film 18 include: a glass sheet (film); a film of resin such as polyethylene terephthalate or polycarbonate; and a film having an inorganic substance such as $SiO_2$, $Al_2O_3$, or SiC deposited on the resin film. For formation of the moisture-proof protective film 18 having 3 layers of $SiO_2$ film/hybrid layer of $SiO_2$ and PVA/$SiO_2$ film on the PET film, the $SiO_2$ films may be formed through sputtering and the hybrid layer may be formed through a sol-gel process, for example. The hybrid layer is preferably formed to have a ratio of PVA to $SiO_2$ of 1:1.

The seal bonding layer 19 is used to bond the moisture-proof protective film 18 to the substrate 12 in a sealing manner in order to enclose the phosphor layer 16 with the moisture-proof protective film 18. The seal bonding layer 19 is, for example, formed from an adhesive having a moisture vapor transmission rate of 1000 g/m$^2$·day or less (at a temperature of 40° C. and a relative humidity of 90%, per 100-μm thickness), has a bonding length f of 2 mm to 10 mm, and is 0.5 μm to 20 μm in thickness.

By using the seal bonding layer 19 described above to bond together the moisture-proof protective film 18, the phosphor layer 16 and the substrate 12, the phosphor panel 10 of the present invention exhibits very strong resistance against moisture, and maintains excellent image recording characteristics for a long period of time even under severe conditions created by high temperature and high humidity.

Stimulable phosphors forming the phosphor layer 16, and in particular alkali halide-based stimulable phosphors are absorbent of moisture and readily absorb moisture in normal environments. The absorbed moisture causes degradation including lowering of the photosensitivity and sharpness of a reproduced image. The present inventor has conducted an extensive investigation to avoid such inconveniences and, as a result, found that moisture permeation through a sealing portion to seal the phosphor layer 16 is the cause of degradation of characteristics of the phosphor panel and that the seal bonding layer 19 having the above-described structure prevents moisture from permeating through the seal bonding layer 19 which bonds the substrate 12 to the moisture-proof protective film 18.

There is no particular limitation on the material to form the seal bonding layer 19, and various adhesives can be employed as long as they can make a layer that has a moisture vapor transmission rate of 10 g/m$^2$·day or less in a width range of 2 mm to 10 mm and a thickness range of 0.5 µm to 20 µm.

Preferable examples of the adhesive for the seal bonding layer 19 include epoxy resin and polyester-based resin. Thermoplastic polymer resin is particularly preferable. Desirably, an adhesive that has a moisture vapor transmission rate after hardening of 500 g/m$^2$·day or less per 100 µm thickness at a temperature of 40° C. and a relative humidity of 90% is employed. When the moisture vapor transmission rate exceeds 1000 g/m$^2$·day, moisture permeation is not highly prevented and a satisfactory moisture-proof effect cannot be obtained.

As mentioned above, the seal bonding layer 19 preferably has a bonding length f of 2 mm to 10 mm and a thickness of 0.5 µm to 20 µm.

If the bonding length f of the seal bonding layer 19 is less than 2 mm, the adhesion between the substrate 12 and the moisture-proof protective film 18 may not be strong enough to avoid peeling of the moisture-proof protective film 18 or other problems. In this case, the resultant moisture-proof effect is unsatisfactory.

On the other hand, if the bonding length f exceeds 10 mm, the size of the seal bonding layer 19 is increased too much in relation to the overall size of the phosphor panel 10, so the ratio of the image pick-up area to the phosphor panel 10 is made small. Even when the seal bonding layer 19 is bonded to the side faces or rear face of the substrate, the productivity is decreased, which causes a problem in practical use of the phosphor panel 10. The preferable bonding length f is 3 mm to 6 mm.

If the seal bonding layer 19 is less than 0.5 µm in thickness, the adhesion between the substrate 12 and the moisture-proof protective film 18 may not be strong enough to avoid peeling of the moisture-proof protective film 18 or other problems. On the other hand, if the seal bonding layer 19 is thicker than 20 µm, the possibility of moisture permeation through the seal bonding layer 19 is increased. The preferable thickness of the seal bonding layer 19 is 0.8 µm to 10 µm.

Described next is a method of manufacturing the phosphor panel 10 of this embodiment.

First, the recess 14 is formed in the approximately rectangular substrate 12 to have a predetermined depth and a predetermined size. At this point, the recess 14 is positioned such that the distance from the longer side faces 12b and 12d of the substrate 12 to the longer side walls of the recess 14 is L and that the distance from the shorter side faces 12e of the substrate 12 to the shorter side walls of the recess 14 is W.

Next, the phosphor layer 16 is formed in the recess 14 by, for example, vacuum evaporation. The precision in forming the phosphor layer 16 is such that the level difference between the front face of the phosphor layer 16 and the front face 12a (bonding areas) of the substrate 12 is within ±3 mm.

Then, an adhesive that has a moisture vapor transmission rate of 1000 g/m$^2$·day or less is chosen for the seal bonding layer 19. The chosen adhesive is applied with a dispenser or the like, to the areas of the distance W which are peripheral to the phosphor layer 16 on the front face 12a of the substrate 12 and to the bonding positions on the side faces 12b and 12d of the substrate 12, such that the seal bonding layer 19 has a bonding length f of 2 mm to 10 mm and a thickness of 0.5 µm to 20 µm.

Next, an end of the moisture-proof protective film 18, for example, wound into a roll, is placed over a portion of the side face 12b of the substrate 12 where the adhesive has been applied.

A pressure roll heated to a predetermined temperature is moved at a predetermined linear velocity to bond the end of the moisture-proof protective film 18 under heat and pressure to the side face 12b having one longer side of the substrate 12.

Next, the wound moisture-proof protective film 18 is pulled out to bond under heat and pressure to the front face 12a of the substrate 12 at the portions where the adhesive has been applied, while the pressure roll is moved along the shorter sides of the substrate 12 toward the opposite side face 12d. The perimeter of the moisture-proof protective film 18 is thus bonded to the front face 12a (bonding areas) of the substrate 12.

The moisture-proof protective film 18 is then bonded to the side face 12d having the other longer side of the substrate 12 by the pressure roll. Lastly, the excess portion of the moisture-proof protective film 18 pulled out is cut off.

Thus, the moisture-proof protective film 18 is bonded to the substrate 12 via the seal bonding layer 19 by, for example, thermal lamination, and the phosphor panel 10 (see FIGS. 1A to 1C) with the phosphor layer 16 sealed therein is obtained.

In the method of manufacturing the phosphor panel 10 of the present invention, a reflective film and a barrier film or the like may be formed before forming the phosphor layer 16 as mentioned above. The substrate 12 may have the reflective film and the barrier film or the like formed on its front face.

In order to improve the adhesion strength between the moisture-proof protective film 18 and the substrate 12 which are bonded together by the seal bonding layer 19 and in order to obtain sufficient adhesion strength by performing thermal lamination only once, it is preferable to heat the sealing portion and the phosphor layer 16 at a temperature ranging from a temperature 30° C. lower than the softening temperature of the seal bonding layer 19 to 150° C., prior to sealing the phosphor layer 16 with the moisture-proof protective film 18. The sealing portion and the phosphor layer 16 can be heated to a temperature in the above range by, for example, heating the substrate 12.

As has been described, this embodiment can achieve a certain level of moisture-proof effect by bonding the moisture-proof protective film 18 to the side faces 12b and 12d of the substrate 12 even in the case where the distance from the longer ends of the phosphor layer 16 to the side faces 12b and 12d of the substrate 12 is too short for the moisture-proof protective film 18 to provide a satisfactory moisture-proof effect when bonded to the front face 12a of the substrate 12. Accordingly, the distance from the longer ends of the phosphor layer 16 to the side faces 12b and 12d of the substrate 12 can be reduced to secure a large enough image-forming area to photograph the chest wall. This makes the phosphor panel 10 suitable for mammography.

In addition, since the phosphor layer 16 is sealed with the moisture-proof protective film 18, degradation of image recording characteristics caused by moisture absorption can be avoided for a long period of time even under severe conditions created by high temperature and high humidity.

Another advantage of the phosphor panel 10 of this embodiment is that one of the side faces 12b and 12d can face the human body when the phosphor panel 10 is in use, because each distance L in the direction parallel to the shorter sides of the phosphor panel 10 is short and an image-forming area large enough to photograph the chest wall can be secured.

Furthermore, the moisture-proof protective film 18 in this embodiment can be sequentially bonded to the side face 12b of the substrate 12, the front face 12a of the substrate 12, and the opposite side face 12d of the substrate 12, whereby the moisture-proof protective film 18 can be bonded to the substrate 12 without being wrinkled or strained while the phosphor layer 16 can be sealed therewith.

Moreover, the perimeter (ends) of the moisture-proof protective film 18 is bonded to the side faces 12b and 12d of the substrate 12 merely through the seal bonding layer 19, and no special member is necessary. The phosphor panel 10 can therefore be manufactured easily and is highly productive.

The present invention is not limited to this embodiment where the ends of the moisture-proof protective film 18 are bonded to the side faces 12b and 12d of the substrate 12. Instead, the ends of the moisture-proof protective film 18 may be bonded to a rear face 12c of the substrate 12 if the bonding length f of the seal bonding layer 19 is within an appropriate range.

A second embodiment of the present invention will be described next.

Figure 3A:
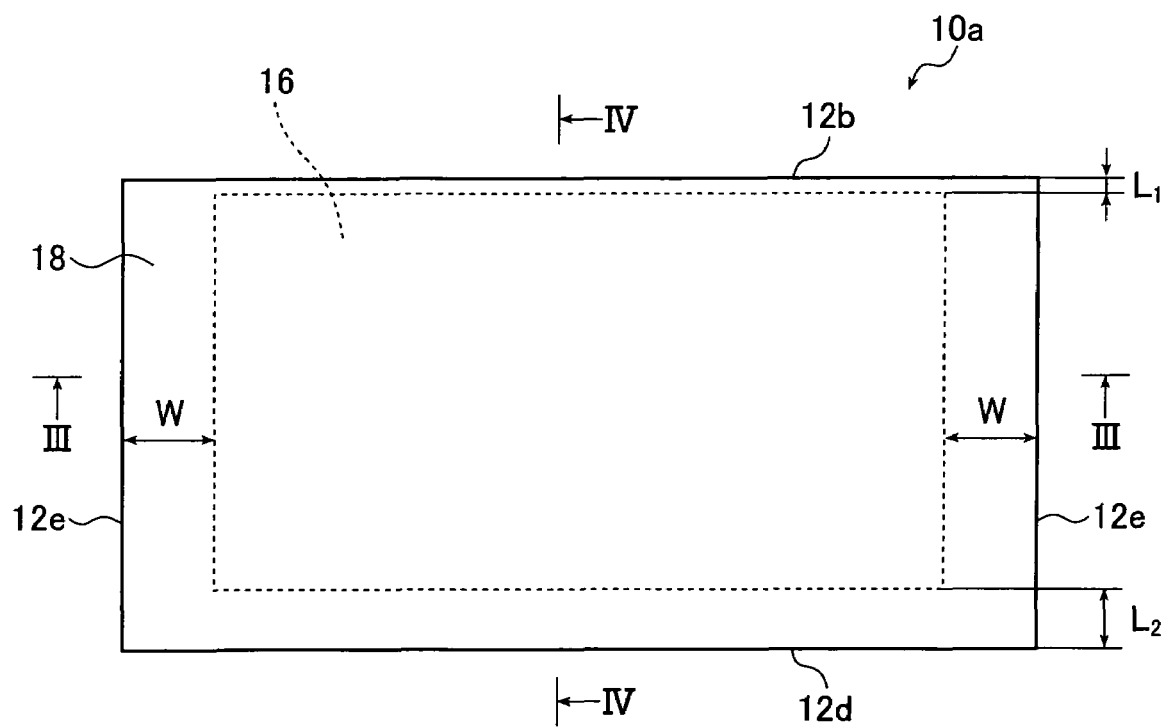
FIG. 3A is a schematic plan view showing a radiographic image conversion panel for mammography according to a second embodiment of the present invention.
Figure 3B:
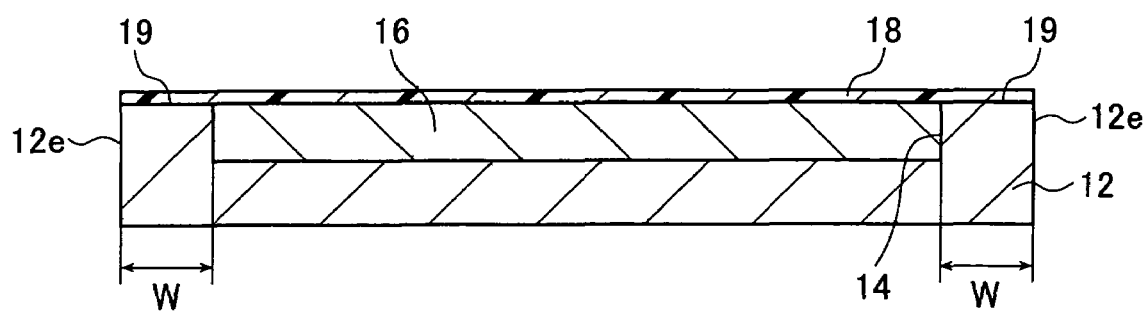
FIG. 3B is a sectional view taken along the line III-III of FIG. 3A.
Figure 3C:
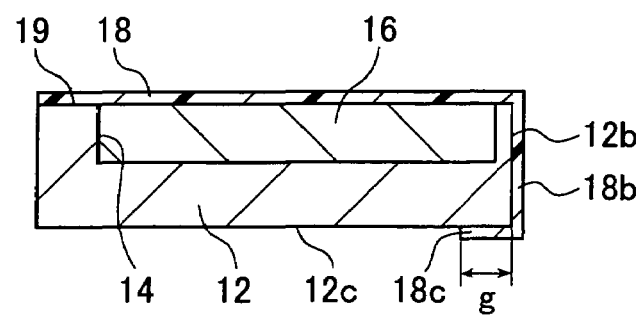
FIG. 3C is a sectional view taken along the line IV-IV of FIG. 3A.
Figure 4:
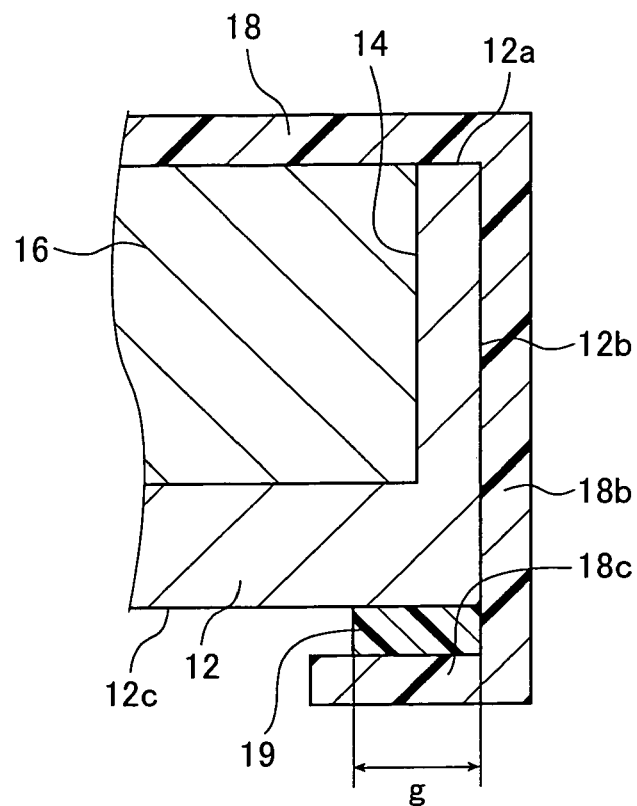
FIG. 4 is an enlarged view of an essential part of FIG. 3C.

FIG. 3A is a schematic plan view showing a radiographic image conversion panel for mammography according to the second embodiment of the present invention. FIG. 3B is a sectional view taken along the line III-III of FIG. 3A. FIG. 3C is a sectional view taken along the line IV-IV of FIG. 3A. FIG. 4 is an enlarged view of an essential part of FIG. 3C.

In this embodiment, components corresponding to those of the phosphor panel 10 of the first embodiment shown in FIGS. 1A to 1C and FIG. 2 will be denoted by the same reference symbols and numerals, and the detailed description thereof will be omitted.

A phosphor panel 10a of this embodiment shown in FIGS. 3A to 3C differs from the phosphor panel 10 of the first embodiment (see FIGS. 1A to 1C) in terms of the position where the recess 14 is formed and the position where the moisture-proof protective film 18 is bonded to the substrate 12. The structure of the phosphor panel 10a is the same as that of the phosphor panel 10 of the first embodiment except the above points, and therefore will not be described in detail.

The recess 14 in this embodiment is positioned such that the distance from the side face 12b having one longer side of the substrate 12 to one longer inner wall of the recess 14 is $L_1$ (a first distance) and that the distance from the side face 12d having the other longer side of the substrate 12 to the other longer inner wall of the recess 14 is $L_2$ (a second distance). The distance from each shorter side face 12e of the substrate 12 to the corresponding shorter inner wall of the recess 14 is W (the second distance).

The distance $L_1$ is a length that is not long enough to provide a satisfactory moisture-proof property when the moisture-proof protective film 18 is bonded to the substrate 12 by the seal bonding layer 19. The distance $L_2$ is a length that is long enough to provide a satisfactory moisture-proof property when the moisture-proof protective film 18 is bonded to the substrate 12 by the seal bonding layer 19. While the phosphor panel 10a of this embodiment is in use, the side face 12b having one longer side of the substrate 12 faces the human body.

As shown in FIG. 3C and FIG. 4, the moisture-proof protective film 18 has a bent portion 18b, which is bent to fit the side face 12b and rear face 12c of the substrate 12, and an end 18c, which is bonded to the bottom (rear) face 12c of the substrate 12 along one longer side of the substrate 12.

The moisture-proof protective film 18 is bonded by the seal bonding layer 19 to an area of the distance $L_2$ and an area of the distance W on the front face 12a of the substrate 12. The bonding length g in this embodiment is identical with the bonding length f in the first embodiment, and is 2 mm or more as is the bonding length f. The bonding length along which the moisture-proof protective film 18 is bonded by the seal bonding layer 19 in the area of the distance $L_2$ and the area of the distance w is long enough to provide a moisture-proof effect, and is 2 mm to 10 mm, for example.

Thus, the moisture-proof protective film 18 can easily be stuck on the substrate 12 by bonding the perimeter (ends) of the moisture-proof protective film 18, via the seal bonding layer 19, through, for example, thermal lamination, to the bottom face 12c along one longer side of the substrate 12 and to the area of the distance $L_2$ and the area of the distance W on the front face 12a of the substrate 12. As in the first embodiment, the second embodiment can achieve a predetermined level of moisture-proof effect even in the case where the distance from at least one longer end of the phosphor layer 16 to the side face 12b of the substrate 12 is too short for the moisture-proof protective film 18 to provide a satisfactory moisture-proof effect when bonded to the front face 12a of the substrate 12. Accordingly, the distance from a longer end of the phosphor layer 16 to the side face 12b of the substrate 12 can be reduced to secure a large enough image-forming area to photograph the chest wall. This makes the phosphor panel 10a suitable for mammography.

In this embodiment, the moisture-proof protective film 18 may not always be bonded to the rear face 12c of the substrate 12, but may be bonded to one of the side faces 12b and 12d instead. Also, in this case, the same effect as the first embodiment is obtained.

Described next is a method of manufacturing the phosphor panel 10a of this embodiment.

The method of manufacturing the phosphor panel 10a differs from the method of manufacturing the phosphor panel 10 of the first embodiment in terms of the position where the recess 14 is formed and the position where the moisture-proof protective film 18 is bonded. The method of manufacturing the phosphor panel 10a is the same as the method of manufacturing the phosphor panel 10 of the first embodiment except the above points, and therefore will not be described in detail.

In this embodiment, the phosphor layer 16 is formed in the recess 14 and then an adhesive is applied by, for example, a dispenser, to the bottom face 12c of the substrate 12 and to the area of the distance $L_2$ and area of the distance W on the front face 12a of the substrate 12.

Next, the substrate 12 is turned upside down, the moisture-proof protective film 18, which is wound into a roll, is then pulled out, and the end 18c of the moisture-proof protective film 18 is bonded to the rear face 12c of the substrate 12 by a pressure roll.

Then, the substrate 12 is turned again to bond the moisture-proof protective film 18 under heat and pressure to the front face 12a of the substrate 12 while the pressure roll is moved over the moisture-proof protective film 18 toward the side face 12*d*. The perimeter of the moisture-proof protective film 18 is thus bonded to the front face 12*a* of the substrate 12.

Thus, the moisture-proof protective film 18 is bonded to the substrate 12 via the seal bonding layer 19 to seal the phosphor layer 16, thereby obtaining the phosphor panel 10*a*.

The same effect as the first embodiment is obtained with the method of manufacturing the phosphor panel 10*a* of this embodiment.

In order to obtain an improved and good adhesion strength between the moisture-proof protective film 18 and the substrate 12 which are bonded together by the seal bonding layer 19, it is preferable to heat the sealing portion and the phosphor layer 16 at a temperature ranging from a temperature 30° C. lower than the softening temperature of the seal bonding layer 19 to 150° C., prior to sealing the phosphor layer 16 with the moisture-proof protective film 18.

Here, the present invention is not limited to such a phosphor panel that has a recess in a substrate and forms a phosphor layer in the recess.

A third embodiment of the present invention will be described next.

Figure 5:
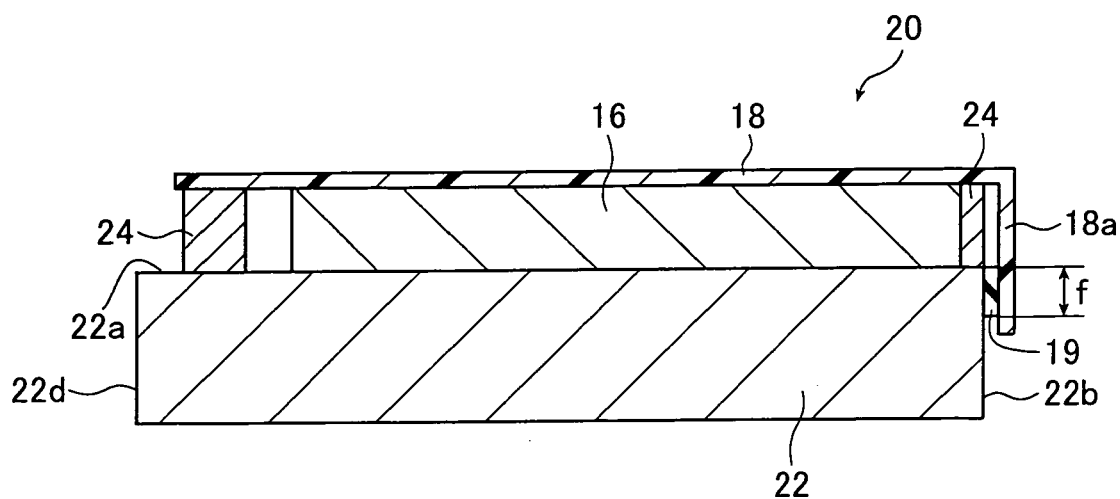
FIG. 5 is a schematic sectional view showing a radiographic image conversion panel for mammography according to a third embodiment of the present invention.

FIG. 5 is a schematic sectional view showing a radiographic image conversion panel for mammography according to the third embodiment of the present invention, and corresponds to the sectional view taken along the line II-II of FIG. 1A. The seal bonding layer 19 is omitted in FIG. 5.

In this embodiment, components corresponding to those of the phosphor panel 10 of the first embodiment shown in FIGS. 1A to 1C and FIG. 2 will be denoted by the same reference symbols and numerals, and the detailed description thereof will be omitted.

A phosphor panel 20 of this embodiment differs from the phosphor panel 10 of the first embodiment in that no recess is formed in a substrate 22. The recess 14 is replaced by, for example, as shown in FIG. 5, a frame (sealing portion) 24 formed on a front face 22*a* of the substrate 22. The phosphor layer 16 is formed within the frame 24.

The frame 24 of this embodiment is formed around the outer edges of the recess 14 shown in the first embodiment or the second embodiment. The distance from a side face 22*b* having one longer side of the substrate 22 to a longer inner wall of the frame 24 and the distance from a side face 22*d* having the other longer side of the substrate 22 to a longer inner wall of the frame 24 are set, as in the above-described first embodiment or second embodiment, such that a large enough image-forming area to photograph the chest wall is obtained. In this embodiment, the distance can be adjusted by, for example, reducing the thickness of the frame 24 on the side facing the human body.

As in the first embodiment, the level difference is preferably small between the top face of the frame 24 and the front face of the phosphor layer 16. When the level difference is small, the moisture-proof protective film 18 is prevented from bending sharply along the perimeter of the phosphor layer 16 during thermal lamination, and lowering of the moisture-proof level caused by damage to the moisture-proof layer ($SiO_2$ layer) due to sharp bending can be avoided. Therefore, the level difference between the top face of the frame 24 when fixed onto the substrate 22 and the front face of the phosphor layer 16 is preferably small, desirably, within ±0.3 mm.

The width of the frame 24 is not particularly limited as long as a large enough image-forming area to photograph the chest wall is secured along at least one longer side of the panel. The frame 24 can have any width if, as in the first embodiment or the second embodiment, it is true for at least one of two pairs of two parallel sides, the sides in one pair being orthogonal to the sides in the other pair, that the distance from one end of the frame 24 to one of the two parallel sides forming the pair is set to secure a large enough image-forming area necessary to photograph the chest wall. For the remaining three sides of the four sides of the panel, the width of the frame 24 corresponds to the bonding length f of the seal bonding layer 19, and is preferably 2 mm to 10 mm as in the first embodiment. The frame 24 may be formed from aluminum.

In this embodiment, an end of the moisture-proof protective film 18 is bonded to the side face 22*b* of the substrate 22. To which part of the substrate the moisture-proof protective film 18 is bonded is not particularly limited, and the moisture-proof protective film 18 can be bonded in the same manner as in the phosphor panel 10 of the first embodiment and the phosphor panel 10*a* of the second embodiment. The same effect as the above-described first embodiment is obtained also when the frame 24 surrounds the phosphor layer 16 formed on the front face 22*a* of the substrate 22 as in the phosphor panel 20 of this embodiment.

Described next is a method of manufacturing the phosphor panel 20 of this embodiment.

First, the frame 24 is fixed to the front face 22*a* of the substrate 22. Examples of the method for fixing the frame 24 include adhesion with a heat-resistant epoxy adhesive or the like, and fitting the frame 24 to a groove formed in the substrate 22. The groove improves the positional accuracy in evaporation for forming the phosphor layer 16.

Then, Kapton tape bearing a heat-resistant adhesive is stuck to the frame 24 and the excess portion of the tape is cut off along the inner edges of the frame 24. The phosphor layer 16 is formed within the frame 24 attached to the substrate 22.

Next, an adhesive is applied with a dispenser to the top face of the frame 24 and the side face 22*b* of the substrate 22 so that the bonding length f is 2 mm or longer. The subsequent steps of bonding the moisture-proof protective film 18 are the same as the bonding steps in the first embodiment, and thus will not be described in detail. The phosphor layer 16 in this embodiment can also be sealed with the moisture-proof protective film 18 through, for example, thermal lamination.

Also, in this embodiment, in order to obtain an improved and good adhesion strength between the moisture-proof protective film 18 and the substrate 12 which are bonded together by the seal bonding layer 19, it is preferable to heat the sealing portion and the phosphor layer 16 at a temperature ranging from a temperature 30° C. lower than the softening temperature of the seal bonding layer 19 to 150° C., prior to sealing the phosphor layer 16 with the moisture-proof protective film 18.

A fourth embodiment of the present invention will be described next.

Figure 6A:
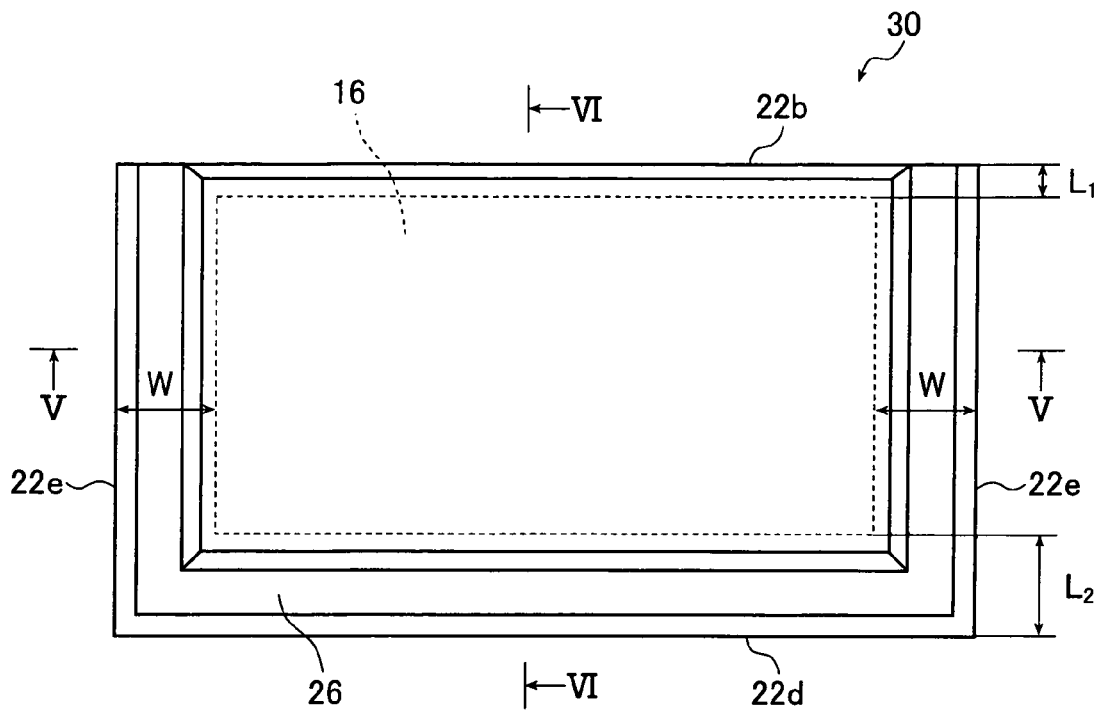
FIG. 6A is a schematic plan view showing a radiographic image conversion panel for mammography according to a fourth embodiment of the present invention.
Figure 6B:
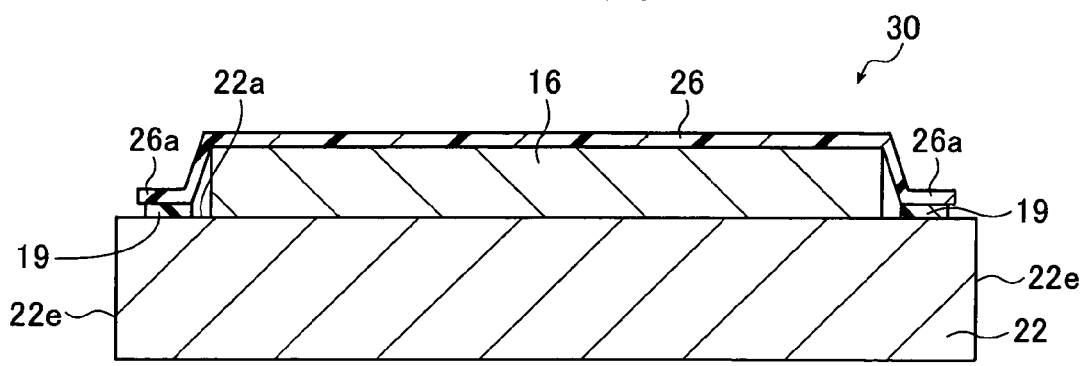
FIG. 6B is a sectional view taken along the line V-V of FIG. 6A.
Figure 6C:
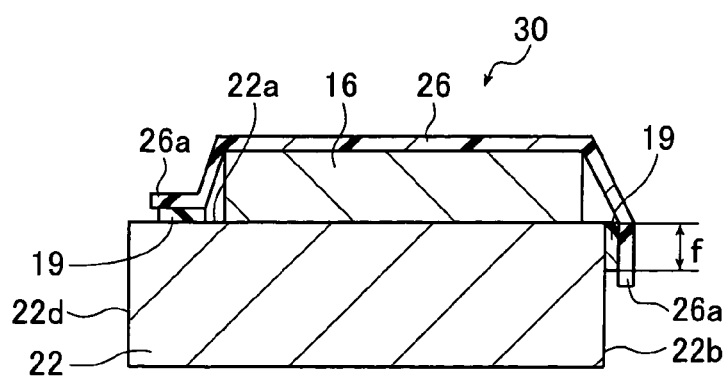
FIG. 6C is a sectional view taken along the line VI-VI of FIG. 6A.
Figure 9A:
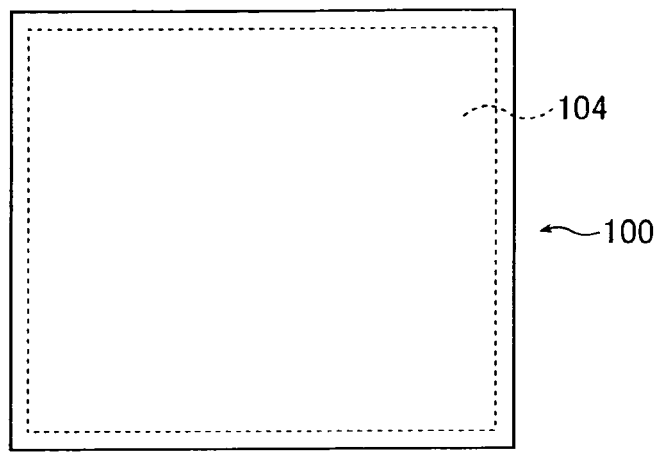
FIG. 9A is a plan view showing a first radiographic image conversion panel of prior art.
Figure 9B:
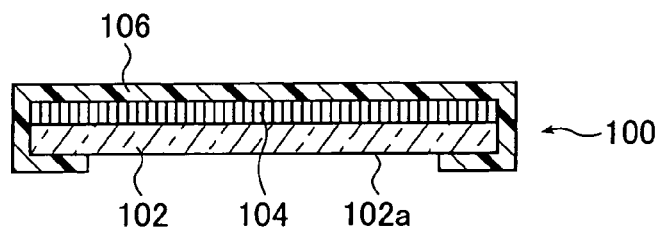
FIG. 9B is a schematic sectional view of FIG. 9A.
Figure 10A:
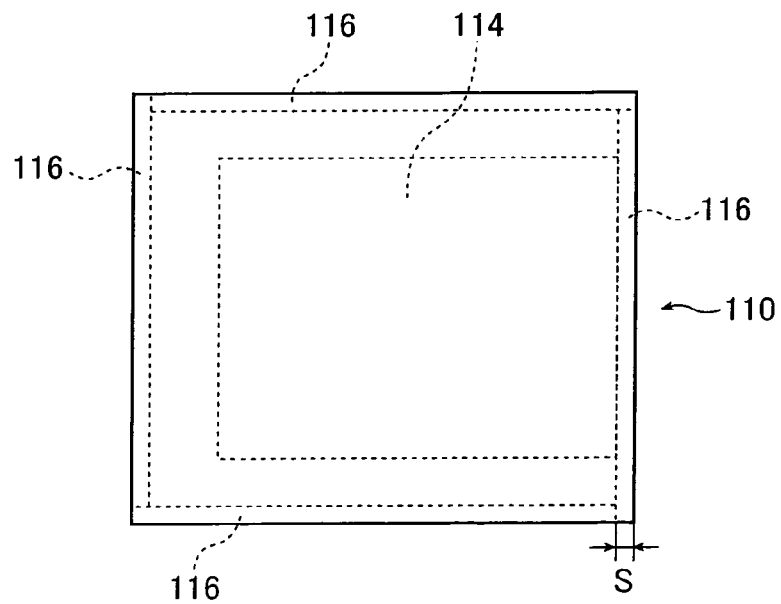
FIG. 10A is a plan view showing a second radiographic image conversion panel of prior art.
Figure 10B:
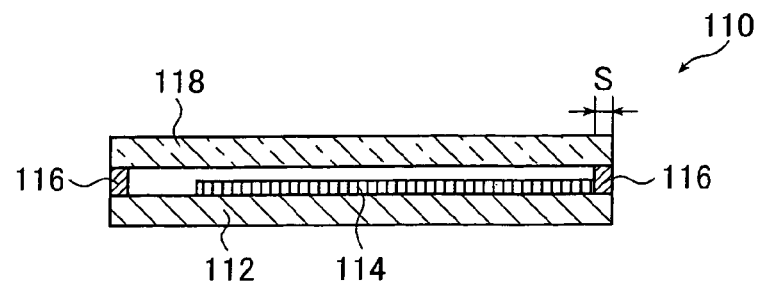
FIG. 10B is a schematic sectional view of FIG. 10A.

FIG. 6A is a schematic plan view showing a radiographic image conversion panel for mammography according to the fourth embodiment of the present invention. FIG. 6B is a sectional view taken along the line V-V of FIG. 6A. FIG. 6C is a sectional view taken along the line VI-VI of FIG. 6A.

In this embodiment, components corresponding to those of the phosphor panel 10*a* of the second embodiment shown in FIGS. 3A to 3C will be denoted by the same reference symbols and numerals, and the detailed description thereof will be omitted.

A phosphor panel 30 of this embodiment differs from the phosphor panel 10*a* of the second embodiment in that the phosphor layer 16 of this embodiment is formed on the front face 22*a* of the substrate 22 to protrude from the front face 22*a* of the substrate 22, and in that a bent portion 26*a* obtained by bending an end of a moisture-proof protective film 26 is bonded to the side face 22*b* having one longer side of the substrate 22. The structure of the phosphor panel 30 is the same as the phosphor panel 10a of the second embodiment except the above points, and therefore will not be described in detail. The phosphor panel 30 of this embodiment is also used with the side face 22b having one longer side of the substrate 22 facing toward the human body. The position where the phosphor layer 16 in this embodiment is formed is the same as in the second embodiment. In other words, the distance from one longer end of the phosphor layer 16 to the side face 22b is $L_1$, the distance from the other longer end of the phosphor layer 16 to the side face 22d is $L_2$, and the distance from each shorter end of the phosphor layer 16 to the corresponding side face 22e is W.

In the phosphor panel 30 of this embodiment, an end of the moisture-proof protective film 26 is bonded to the side face 22b by the seal bonding layer 19 having the bonding length f. The remaining ends of the moisture-proof protective film 26 are bonded to the front face 22a of the substrate 22 by the seal bonding layer 19 having the bonding length f.

This embodiment in which the phosphor layer 16 is formed on the front face 22a of the substrate 22, can also protect the phosphor layer 16 from moisture and obtain the same effect as the above-described second embodiment, namely, avoiding for a long period of time degradation of image recording characteristics due to moisture absorption even under severe conditions created by high temperature and high humidity.

As in the second embodiment, this embodiment can obtain a predetermined level of moisture-proof effect at the side face 22d even in the case where the distance from one longer end of the phosphor layer 16 to the side face 22b of the substrate 22 is too short for the moisture-proof protective film 26 to provide a satisfactory moisture-proof effect when bonded to the front face 22a of the substrate 22. Accordingly, the distance from a longer end of the phosphor layer 16 to the side face 22b of the substrate 22 can be reduced to secure a large enough image-forming area to photograph the chest wall. This makes the phosphor panel 30 suitable for mammography.

The method of manufacturing the phosphor panel 30 of this embodiment differs from the method of manufacturing the phosphor panel 10a of the second embodiment in that the phosphor layer 16 is formed on the front face 22a of the substrate 22. The method of manufacturing the phosphor panel 30 is the same as the methods of manufacturing the phosphor panel 10 of the first embodiment and the phosphor panel 10a of the second embodiment except the above point, and therefore will not be described in detail.

Also, in this embodiment, in order to obtain an improved and good adhesion strength between the moisture-proof protective film 26 and the substrate 22 which are bonded together by the seal bonding layer 19, it is preferable to heat the sealing portion and the phosphor layer 16 at a temperature ranging from a temperature 30° C. lower than the softening temperature of the seal bonding layer 19 to 150° C., prior to sealing the phosphor layer 16 with the moisture-proof protective film 26.

The same effect as the second embodiment is obtained with the method of manufacturing the phosphor panel 30 of this embodiment.

The substrate 22 of this embodiment may be formed from materials other than those given as examples for the substrate 12 of the phosphor panel 10 in the first embodiment. For instance, a plastic film such as a cellulose acetate film, a polyester film, a polyethylene terephthalate film, a polyamide film, a polyimide film, a triacetate film, or a polycarbonate film may be employed for the substrate 22 of this embodiment.

A fifth embodiment of the present invention will be described next.

Figure 7:
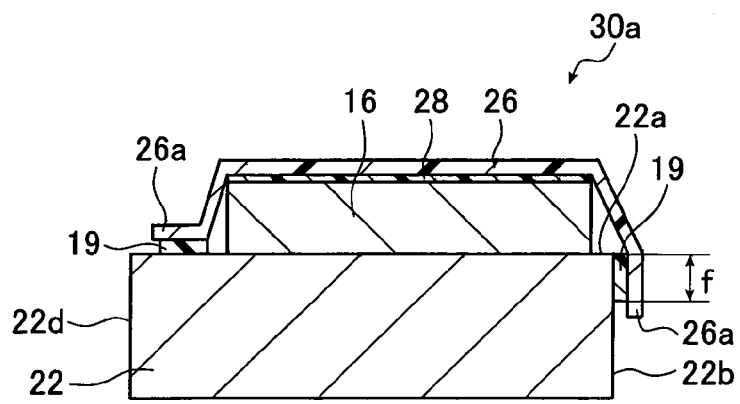
FIG. 7 is a schematic sectional view showing a radiographic image conversion panel for mammography according to a fifth embodiment of the present invention.

FIG. 7 is a schematic sectional view showing a radiographic image conversion panel for mammography according to the fifth embodiment of the present invention, and corresponds to the sectional view taken along the line II-II of FIG. 1A.

In this embodiment, components corresponding to those of the phosphor panel 30 of the fourth embodiment shown in FIGS. 6A to 6C will be denoted by the same reference symbols and numerals, and the detailed description thereof will be omitted.

A phosphor panel 30a of this embodiment differs from the phosphor panel 30 of the fourth embodiment in that a stimulable phosphor adhesion layer 28 is provided to bond the phosphor layer 16 to the moisture-proof protective film 26. The structure of the phosphor panel 30a is the same as that of the phosphor panel 30 of the fourth embodiment except the above point, and therefore will not be described in detail.

In this embodiment, the stimulable phosphor adhesion layer 28 is formed on a front face of the phosphor layer 16.

The stimulable phosphor adhesion layer 28 can be formed from various adhesives as long as they have enough adhesion strength and optical characteristics that do not prevent radiation rays from entering and light emitted upon stimulation from exiting. For example, epoxy resin and polyester-based resin are preferably used for the adhesive, and polyester-based resin and other thermoplastic polymer resin are particularly preferable. The phosphor layer 16 can be bonded to the moisture-proof protective film 26 through thermal lamination by using a thermoplastic polymer resin, which leads to the improvement in workability and productivity. The thickness of the stimulable phosphor adhesion layer 28 is not particularly limited, but is preferably 0.8 μm to 10 μm.

The stimulable phosphor adhesion layer 28 is not limited to any particular size as long as it is large enough to cover the front face of the phosphor layer 16. There are no particular limitations put on how or under what conditions the stimulable phosphor adhesion layer 28 is to be formed. A preferable example is to form the stimulable phosphor adhesion layer 28 by application.

It is preferable to place the stimulable phosphor adhesion layer 28 between the phosphor layer 16 and the moisture-proof protective film 26, because the moisture-proof protective film 26 is not peeled off even after the phosphor panel 30a has been used for a long time period, and the phosphor panel 30a has an improved durability.

Described next is a method of manufacturing the phosphor panel 30a of this embodiment.

First, the phosphor layer 16 is formed on the front face 22a of the substrate 22, and the method of manufacturing the phosphor panel 30 of the fourth embodiment is employed to form the seal bonding layer 19 at a position where the moisture-proof protective film 26 is to be bonded to an area of the front face 22a of the substrate 22 that surrounds the phosphor layer 16.

A suitably chosen adhesive is applied to at least one of a predetermined central area on the surface of the moisture-proof protective film 26 and the front face of the phosphor layer 16, so that the stimulable phosphor adhesion layer 28 formed can have a predetermined thickness.

Lastly, for example when the stimulable phosphor adhesion layer 28 is formed on the moisture-proof protective film 26, the moisture-proof protective film 26 having the stimulable phosphor adhesion layer 28 is placed over the phosphor layer 16, and the moisture-proof protective film 26 is bonded under heat and pressure to the phosphor layer 16 by the stimulable phosphor adhesion layer 28 through, for example, thermal lamination carried out in a laminator at a predetermined temperature and a predetermined linear velocity. Preferably, the substrate is passed through the laminator in one direction a predetermined number of times to improve the adhesion strength.

Also, in this embodiment, in order to obtain an improved and good adhesion strength between the moisture-proof protective film 26 and the substrate 22 which are bonded together by the seal bonding layer 19, it is preferable to heat the sealing portion and the phosphor layer 16 at a temperature -ranging from a temperature 30° C. lower than the softening temperature of the seal bonding layer 19 to 150° C., prior to sealing the phosphor layer 16 with the moisture-proof protective film 26.

A sixth embodiment of the present invention will be described next.

Figure 8:
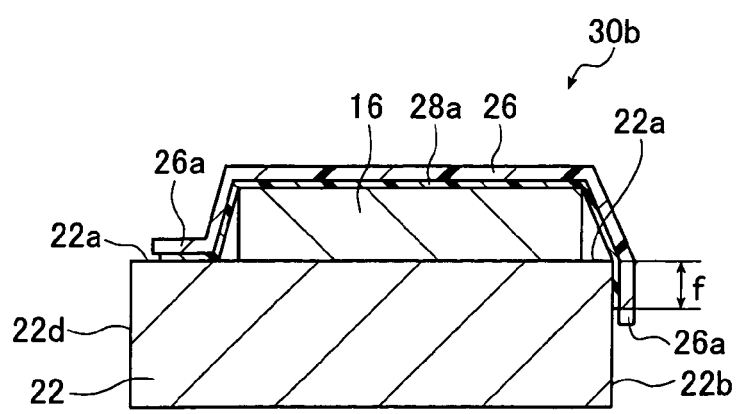
FIG. 8 is a schematic sectional view showing a radiographic image conversion panel for mammography according to a sixth embodiment of the present invention.

FIG. 8 is a schematic sectional view showing a radiographic image conversion panel for mammography according to the sixth embodiment of the present invention, and corresponds to the sectional view taken along the line II-II of FIG. 1A.

In this embodiment, components corresponding to those of the phosphor panel 30a of the fifth embodiment shown in FIG. 7 will be denoted by the same reference symbols and numerals, and the detailed description thereof will be omitted.

A phosphor panel 30b of this embodiment is different from the phosphor panel 30a of the fifth embodiment in a stimulable phosphor adhesion layer 28a, which also serves as the stimulable phosphor adhesion layer 28 for bonding together the seal bonding layer 19, the moisture-proof protective film 26, and the phosphor layer 16. The structure of the phosphor panel 30b is the same as that of the phosphor panel 30a of the fifth embodiment except the above point, and therefore will not be described in detail.

In this embodiment, the stimulable phosphor adhesion layer 28a and the seal bonding layer 19 are formed on the same plane. This gives the phosphor panel 30b better durability as the stimulable phosphor adhesion layer 28 of the fifth embodiment, and makes it possible to bond the moisture-proof protective film 26 to the phosphor layer 16 and to the substrate 22 at once, thereby improving the productivity and workability even more. The stimulable phosphor adhesion layer 28a preferably has a thickness of 0.8 µm to 10 µm.

The stimulable phosphor adhesion layer 28a can be formed from the same material in the same manner as the stimulable phosphor adhesion layer 28 of the phosphor panel 30a. The phosphor layer 16 and the substrate 22 can be bonded to the moisture-proof protective film 26 through thermal lamination by using a thermoplastic polymer resin for the stimulable phosphor adhesion layer 28a, which leads to the improvement in workability and productivity.

The thickness of the stimulable phosphor adhesion layer 28a is not particularly limited, as long as it has a predetermined thickness all over the moisture-proof protective film 26. There are no particular limitations put on how or under what conditions the stimulable phosphor adhesion layer 28a is to be formed. For instance, the stimulable phosphor adhesion layer 28a is formed by application.

Described next is a method of manufacturing the phosphor panel 30b of this embodiment.

The manufacturing method of this embodiment differs from the manufacturing method of the fifth embodiment in that the stimulable phosphor adhesion layer 28a is formed from a suitably chosen adhesive so as to have a predetermined thickness all over the moisture-proof protective film 26, and in that the seal bonding layer 19 is not formed. The manufacturing method of this embodiment is the same as the manufacturing method of the fifth embodiment except the above points, and therefore will not be described in detail.

The stimulable phosphor adhesion layer 28a is formed such that, after the moisture-proof protective film 26 is bonded to the substrate 22, the bonding length f is 2 mm to 10 mm and the thickness b is 0.5 µm to 20 µm in the bonding portion (i.e., the portion corresponding to the seal bonding layer 19).

The stimulable phosphor adhesion layer 28a bonds the moisture-proof protective film 26 to the phosphor layer 16 and further bonds the moisture-proof protective film 26 to the substrate 22. The stimulable phosphor adhesion layer 28a unifies a layer for bonding the moisture-proof protective film 26 to the phosphor layer 16 and a layer for bonding the moisture-proof protective film 26 to the substrate 22, and can be formed by applying the material once.

Also in this embodiment, in order to obtain an improved and good adhesion strength between the moisture-proof protective film 26 and the substrate 22, it is preferable to heat the sealing portion and the phosphor layer 16 at a temperature ranging from a temperature 30° C. lower than the softening temperature of the stimulable phosphor adhesion layer 28a to 150° C., prior to sealing the phosphor layer 16 with the moisture-proof protective film 26.

When the phosphor layer 16 is formed on the front face 22a of the substrate 22 thus creating a level difference between the front face of the phosphor layer 16 and the front face 22a of the substrate 22 as in the fourth through sixth embodiments described above, it is preferable to seal the phosphor layer 16 by changing the lamination direction through turning of the panel by 90° and performing lamination a predetermined number of times in each lamination direction.

The radiographic image conversion panel for mammography and the method of manufacturing the panel according to the present invention have been described above. However, the present invention is not limited to the embodiments described above, and various improvements and modifications can be made without departing from the gist of the present invention.

What is claimed is:

1. A radiographic image conversion panel for mammography comprising:

a substrate having a rectangular shape, and first and second pairs of two parallel sides being orthogonal to each other;

a phosphor layer having a rectangular shape, and being formed on said substrate;

a moisture-proof protective film for sealing said phosphor layer; and a seal bonding layer for bonding the perimeter of said moisture-proof protective film to said substrate, wherein said phosphor layer is positioned on said substrate such that a distance from at least one side of said first pair of two parallel sides of said substrate to an adjacent end of said phosphor layer is a first distance which is not long enough to provide a predetermined level of moisture-proof effect when said moisture-proof protective film is bonded to said substrate through said seal bonding layer, and such that distances from two sides of said second pair of two parallel sides of said substrate to adjacent ends of said phosphor layer are a second distance which is longer than said first distance, and is long enough to provide said predetermined level of the moisture-proof effect when said moisture-proof protective film is bonded to said substrate through said seal bonding layer, and wherein said seal bonding layer is formed in areas of said second distance on said second pair of two parallel sides of said substrate along said perimeter of said phosphor layer, and is formed on a side surface having said at least one side of said first pair of two parallel sides of said substrate, or on said side surface and a rear surface of said substrate.

2. The radiographic image conversion panel for mammography according to claim 1, wherein said first distance is shorter than a critical bonding length being a shortest bonding length which is long enough to provide said predetermined level of the moisture-proof effect when said moisture-proof protective film is bonded to said substrate through said seal bonding layer, and said second distance is equal to or longer than said critical bonding length.

3. The radiographic image conversion panel for-mammography according to claim 2, wherein said critical bonding length is 2 mm, said first distance is less than 2 mm and said second distance is 2 mm or more.

4. The radiographic image conversion panel for mammography according to claim 1, further comprising:

a sealing portion which is formed on said substrate such that said phosphor layer is surrounded in a direction of a surface of said substrate and to which said moisture-proof protective film is bonded with said seal bonding layer, wherein a level difference between said phosphor layer and said sealing portion in an area that at least corresponds to said second distance is within ±0.3 mm.

5. The radiographic image conversion panel for mammography according to claim 1, wherein said seal bonding layer has a moisture vapor transmission rate of 1000 g/m²·day or less, a width of from 2 mm to 10 mm, and a thickness of from 0.5 μm to 20 μm.

6. The radiographic image conversion panel for mammography according to claim 1, wherein said seal bonding layer has a bonding length with which a predetermined moisture-proof level is achieved.

7. The radiographic image conversion panel for mammography according to claim 1, further comprising a frame formed around said phosphor layer in the direction perpendicular to a surface of said substrate, and fixed on said substrate.

8. The radiographic image conversion panel for mammography according to claim 1, further comprising a phosphor adhesion layer for bonding a surface of said substrate to said moisture-proof protective film.

9. The radiographic image conversion panel for mammography according to claim 8, further comprising a layer serving both as said phosphor adhesion layer and said seal bonding layer.

10. A radiographic image conversion panel for mammography comprising:

a substrate having a rectangular shape, and first and second pairs of two parallel sides being orthogonal to each other;

a recess formed in said substrate and having a rectangular shape in plan view;

a phosphor layer being formed in said recess;

a moisture-proof protective film for sealing said phosphor layer; and a seal bonding layer for bonding the perimeter of said moisture-proof protective film to said substrate, wherein said recess is positioned on said substrate such that a distance from at least one side of said first pair of two parallel sides of said substrate to an adjacent inner wall of said recess is a first distance which is not long enough to provide a predetermined level of moisture-proof effect when said moisture-proof protective film is bonded to said substrate through said seal bonding layer, and such that distances from two sides of said second pair of two parallel sides of said substrate to adjacent inner walls of said recess are a second distance which is longer than said first distance, and is long enough to provide said predetermined level of the moisture-proof effect when said moisture-proof protective film is bonded to said substrate through said seal bonding layer, and wherein said seal bonding layer is formed in areas of said second distance on said second pair of two parallel sides of said substrate along said perimeter of said phosphor layer, and is formed on a side surface having said at least one side of said first pair of two parallel sides of said substrate, or on said side surface and a rear surface of said substrate.

11. The radiographic image conversion panel for mammography according to claim 10, wherein said first distance is shorter than a critical bonding length being a shortest bonding length which is long enough to provide said predetermined level of the moisture-proof effect when said moisture-proof protective film is bonded to said substrate through said seal bonding layer, and said second distance is equal to or longer than said critical bonding length.

12. The radiographic image conversion panel for mammography according to claim 11, wherein said critical bonding length is 2 mm, said first distance is less than 2 mm and said second distance is 2 mm or more.

13. The radiographic image conversion panel for mammography according to claim 10, wherein a level difference between a front surface of said phosphor layer and a front surface of said substrate in an area that at least corresponds to said second distance is within ±0.3 mm.

14. The radiographic image conversion panel for mammography according to claim 10, wherein said seal bonding layer has a moisture vapor transmission rate of 1000 g/m²·day or less, a width of from 2 mm to 10 mm, and a thickness of from 0.5 μm to 20 μm.

15. The radiographic image conversion panel for mammography according to claim 10, wherein said seal bonding layer for bonding said moisture-proof protective film to said side surface or said rear surface having said at least one side of said first pair of two parallel sides of said substrate has a bonding length with which a predetermined moisture-proof level is achieved.

16. A method of manufacturing a radiographic image conversion panel for mammography in which a phosphor layer is formed on a rectangular substrate having a rectangular shape, and first and second pairs of two parallel sides being orthogonal to each other, and sealed with a moisture-proof protective film, comprising:

a step of forming said phosphor layer on said substrate such that a distance from at least one side of said first pair of two parallel sides of said substrate to an adjacent end of said phosphor layer is a first distance which is not long enough to provide a predetermined level of moisture-proof effect when said moisture-proof protective film is bonded to said substrate through said seal bonding layer, and such that distances from two sides of said second pair of two parallel sides of said substrate to adjacent ends of said phosphor layer are a second distance which is longer than said first distance, and is long enough to provide said predetermined level of the moisture-proof effect when said moisture-proof protective film is bonded to said substrate through said seal bonding layer;

a step of applying an adhesive to areas of said second distance on said second pair of two parallel sides of said substrate along the perimeter of said phosphor layer and to a side surface having said at least one side of said first pair of two parallel sides of said substrate, or said side surface and a rear surface of said substrate; and a step of bonding the perimeter of said moisture-proof protective film to said areas and said side surface, or said side surface and said rear surface where said adhesive have been applied.

17. A method of manufacturing a radiographic image conversion panel for mammography in which a phosphor layer is formed on a rectangular substrate having a rectangular shape, and first and second pairs of two parallel sides being orthogonal to each other, and sealed with a moisture-proof protective film, comprising:

a step of forming a recess in said substrate such that a distance from at least one side of said first pair of two parallel sides of said substrate to an adjacent inner wall of said recess is a first distance which is not long enough to provide a predetermined level of moisture-proof effect when said moisture-proof protective film is bonded to said substrate through said seal bonding layer, and such that distances from two sides of said second pair of two parallel sides of said substrate to adjacent inner walls of said recess are a second distance which is longer than said first distance, and is long enough to provide said predetermined level of the moisture-proof effect when said moisture-proof protective film is bonded to said substrate through said seal bonding layer;

a step of forming said phosphor layer in said recess;

a step of applying an adhesive to areas of said second distance on said second pair of two parallel sides of said substrate along the perimeter of said phosphor layer and to a side surface having said at least one side of said first pair of two parallel sides of said substrate, or said side surface and a rear surface of said substrate; and a step of bonding the perimeter of said moisture-proof protective film to said areas and said side surface, or said side surface and said rear surface where said adhesive have been applied.

* * * * *